(12) United States Patent
Nakamura et al.

(10) Patent No.: US 10,533,650 B2
(45) Date of Patent: Jan. 14, 2020

(54) TORSIONAL VIBRATION DAMPER

(71) Applicant: TOYOTA JIDOSHA KABUSHIKI KAISHA, Toyota-shi, Aichi-ken (JP)

(72) Inventors: Taiki Nakamura, Susono (JP); Yuya Takahashi, Susono (JP); Morihiro Matsumoto, Susono (JP); Fusahiro Tsukano, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 356 days.

(21) Appl. No.: 15/467,345

(22) Filed: Mar. 23, 2017

(65) Prior Publication Data

US 2017/0276210 A1 Sep. 28, 2017

(30) Foreign Application Priority Data

Mar. 25, 2016 (JP) ................. 2016-062143

(51) Int. Cl.
*F16H 45/02* (2006.01)
*F16F 15/12* (2006.01)

(52) U.S. Cl.
CPC ......... *F16H 45/02* (2013.01); *F16F 15/1202* (2013.01); *F16F 15/1206* (2013.01); *F16H 2045/0268* (2013.01)

(58) Field of Classification Search
CPC ............. F16H 45/02; F16H 2045/0221; F16H 2045/0226; F16H 2045/0263; F16H 2045/0268; F16F 15/1202; F16F 15/1206; F16F 15/13128; F16F 15/13157; F16F 15/1478
See application file for complete search history.

(56) References Cited

U.S. PATENT DOCUMENTS

| | | | |
|---|---|---|---|
| 8,961,346 B2 * | 2/2015 | Murakami | F16F 15/1478 475/347 |
| 2013/0068580 A1 * | 3/2013 | Doegel | F16F 15/1478 192/3.28 |
| 2015/0377321 A1 | 12/2015 | Dieckhoff | |
| 2016/0258519 A1 | 9/2016 | Horita et al. | |
| 2017/0276222 A1 * | 9/2017 | Takahashi | F16F 15/1206 |

FOREIGN PATENT DOCUMENTS

| | | |
|---|---|---|
| DE | 10 2012 217171 A1 | 3/2014 |
| DE | 102014221917 A1 | 5/2015 |
| DE | 102014225376 A1 | 7/2015 |
| DE | 10 2016 100889 A1 | 9/2016 |
| JP | 2008-164013 A | 7/2008 |

* cited by examiner

*Primary Examiner* — Richard M Lorence
(74) *Attorney, Agent, or Firm* — Hunton Andrews Kurth LLP

(57) ABSTRACT

A torsional vibration damper having enhanced damping performance is provided. A first gear held in the holding member includes a first engagement member situated in an opposite side of a fluid coupling and a second engagement member situated between a holding member and the fluid coupling. A second gear is meshed with the first engagement member, and a third gear is meshed with the second engagement member. The second gear is integrated with the input member, the third gear is integrated with the inertial mass, and the holding member is integrated with the output member.

3 Claims, 10 Drawing Sheets

TORSIONAL VIBRATION DAMPER

CROSS-REFERENCE TO RELATED APPLICATIONS

The present invention claims the benefit of Japanese Patent Application No. 2016-062143 filed on Mar. 25, 2016 with the Japanese Patent Office, the disclosures of which are incorporated herein by reference in its entirety.

BACKGROUND

Field of the Disclosure

Embodiment of the present disclosure relates to the art of a vibration damper for suppressing torsional vibrations resulting from torque pulses, by an inertia torque of a mass.

Discussion of the Related Art

JP-A-2008-164013 describes a damper device for absorbing vibrations resulting from pulsation of torque transmitted from an engine to a transmission through a torque converter clutch. The damper device taught by JP-A-2008-164013 comprises, a annular disk to which torque is delivered from the torque converter clutch, an output member to which the torque of the disk is delivered through spring, a sun gear connected to an inertial mass, a ring gear arranged around the sun gear, pinion gears interposed between the sun gear and the ring gear while being supported individually by a shaft protruding from the disk toward opposite side of the torque converter clutch. According to the teachings of JP-A-2008-164013, the ring gear is formed on a plate member integrated with the output member, and the sun gear, the inertial mass, and the pinion gears are disposed between the ring gear and the disk.

In the damper device taught by JP-A-2008-164013, an angular velocity of the sun gear is changed by pulsation of the torque applied to the disk, and the inertia torque of the sun gear resulting from change in the angular velocity thereof is delivered to the output member through the ring gear. In this situation, a phase of the torque transmitted to the output member through the ring gear is reversed to be opposite to that of the torque transmitted to the output member from the disk through the springs. By thus integrating the sun gear with the inertial mass and integrating the ring gear with the output member, an oscillating width of the sun gear with respect to the disk and the ring gear can be widened so that vibration damping performance can be enhanced without enlarging the inertial mass.

That is, the vibration damping performance of the vibration damper taught by JP-A-2008-164013 is enhanced by increasing the inertia moment and the angular velocity of the inertial mass. However, in the damper device taught by JP-A-2008-164013, a size of the sun gear is limited to a space enclosed by the plate member connecting the ring gear to the output member and the disk. For this reason, the vibration damping performance of the sun gear may be limited.

SUMMARY

Aspects of the present disclosure have been conceived noting the foregoing technical problems, and it is therefore an object of the present invention is to improve vibration damping performance of the vibration damper by increasing a design freedom of an inertial mass.

The embodiments of the present application relates to a torsional vibration damper, comprising: a fluid coupling that transmits an output torque of an engine to an output member through fluid; a clutch that transmits the output torque of the engine to the output member without passing through the fluid coupling by engaging an input rotary member and an output rotary member; an input member to which the output torque of the engine is delivered through the clutch; an elastic member that is interposed between the input member and the output member to elastically transmit torque of the input member to the output member; and an inertial mass that applies an inertia torque to the output member, in a phase opposite to that of pulsation of the torque delivered to the output member through the elastic member. In order to achieve the above-explained objective, according to the embodiment of the present application, the torsional vibration damper is provided with: a holding member that is disposed while keeping a predetermined clearance from the clutch and the fluid coupling in an axial direction; a first gear held in the holding member while being allowed to rotate, that includes a first engagement member situated in an opposite side of the fluid coupling, and a second engagement member situated between the holding member and the fluid coupling; a second gear meshed with the first engagement member; and a third gear meshed with the second engagement member. In the torsional vibration damper, the second gear is rotated integrally with the input member, the third gear is rotated integrally with any one of the output member and the inertial mass, and the holding member is rotated integrally with the other of the output member and the inertial mass.

In a non-limiting embodiment, the inertial mass may be connected to the third gear to be rotated integrally therewith, and a pitch circle diameter of the second engagement member may be larger than that of the first engagement member.

In a non-limiting embodiment, the inertial mass may be connected to the holding member to be rotated integrally therewith, and the holding member may include a cylindrical portion protruding toward the fluid coupling that has an internal diameter larger than an those of the second engagement member and the third gear. In this case, the inertial mass may be connected to the cylindrical portion to be rotated integrally therewith, and disposed between the fluid coupling and the second engagement member meshed with the third gear.

Thus, according to the embodiment of the present application, the first gear is held in the holding member. The first engagement member situated in an opposite side of the fluid coupling is meshed with the second gear rotated integrally with the input member to which the engine torque is applied, and the second engagement member situated between the holding member and the fluid coupling is meshed with the third gear rotated integrally with one of the output member and the inertial mass. The other of the output member and the inertial mass rotated integrally with the holding member. That is, the input member, the output member, and the inertial mass may be arranged in tandem in the axial direction of the torsional vibration damper. According to the embodiments of the present application, therefore, the inertial mass may be arranged between the member for transmitting torque through the clutch and the fluid coupling without being restricted by the input member and the output member. In other words, a design freedom of the inertial mass may be increased so that the inertial mass may be enlarged to enhance vibration damping performance of the torsional vibration damper.

In addition, the inertial mass may be connected to the third gear to be rotated integrally therewith. In this case, the pitch circle diameter of the second engagement member meshed with the third gear may be increased to be larger than that of the first engagement member to which the torque of the input member is applied. Consequently, a change in an angular velocity of the inertial mass resulting from pulsation of the torque delivered to the output member may be increased to further enhance the vibration damping performance of the torsional vibration damper.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
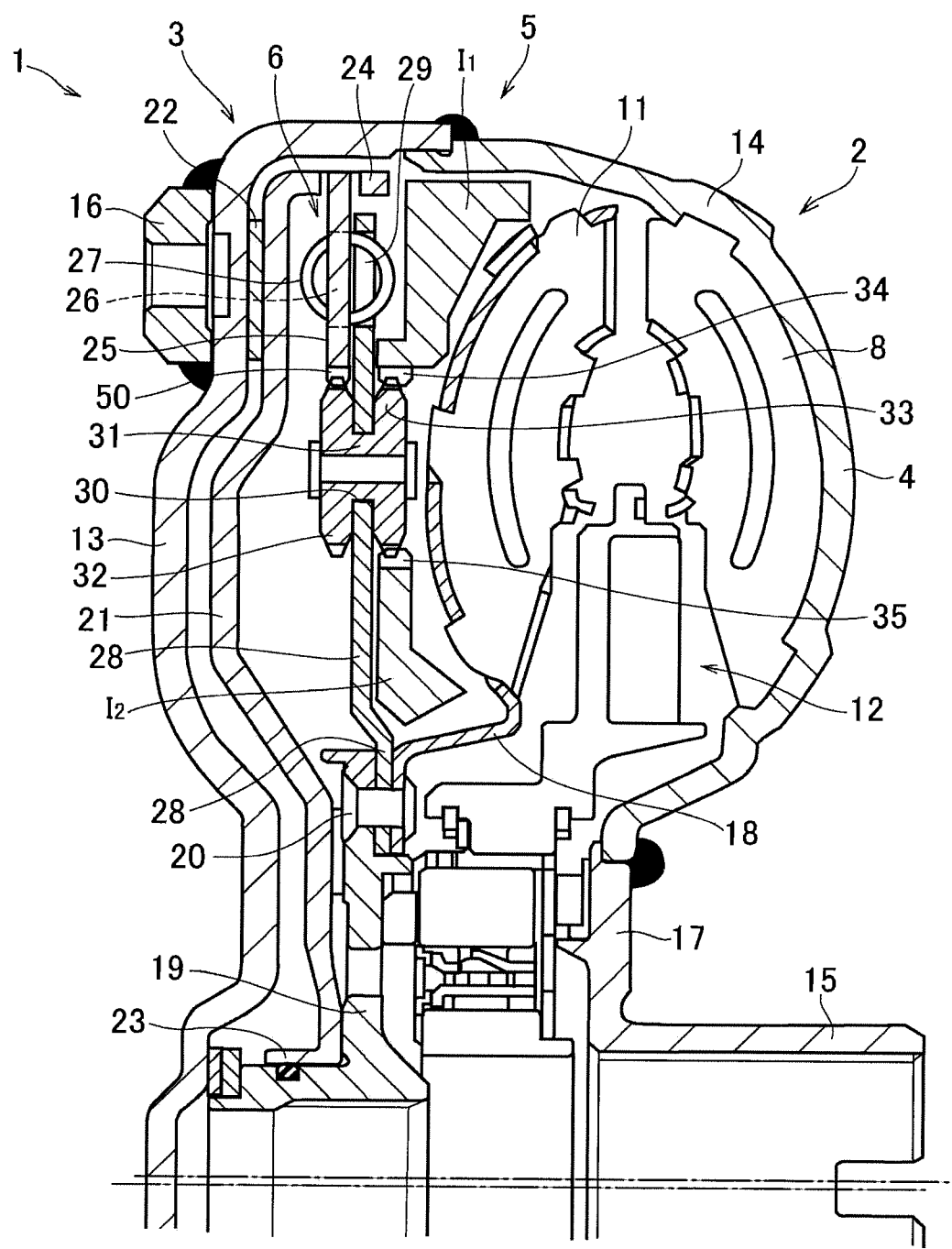
FIG. 1 is a cross-sectional view of the torsional vibration damper according to a first embodiment.
Figure 2:
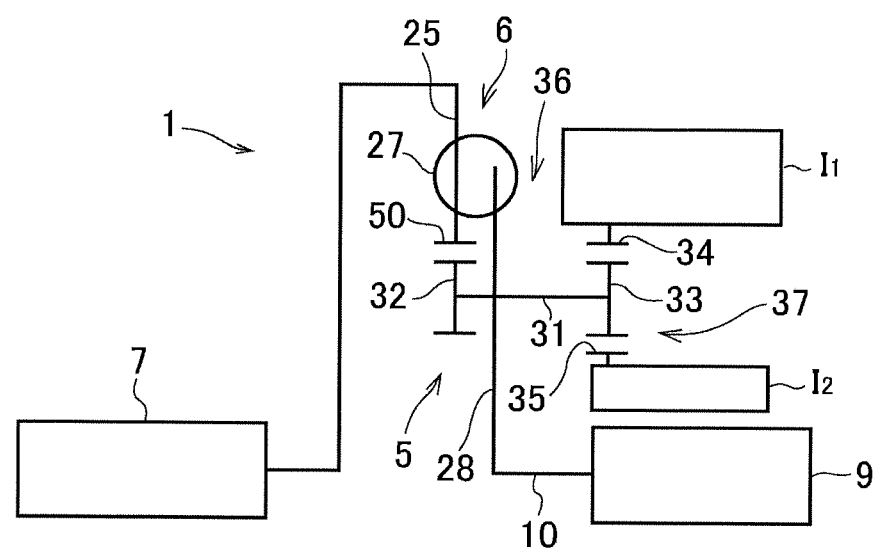
FIG. 2 is a schematic illustration showing the torsional vibration damper according to the first embodiment.

Preferred embodiments of the present application will now be explained with reference to the accompanying drawings. Referring now to FIG. 1, there is shown a cross-section of a torsional vibration damper 1 according to the first embodiment, and FIG. 2 is a schematic diagram of the torsional vibration damper 1. The torsional vibration damper 1 comprises a torque converter 2 and a torque converter clutch 3 that enables torque transmission without passing through the torque converter 2, and an inerter damper 5 and a spring damper 6 are held in a housing 4 of the torque converter 2.

The torque converter 2 as a fluid coupling comprises a pump impeller 8 to which torque of an engine 7 is applied, a turbine runner 11 connected to an input shaft 10 of a transmission 9 while being opposed to the pump impeller 8, and a stator 12 interposed between the pump impeller 8 and the turbine runner 11.

The housing 4 includes a front cover 13 to which the torque of the engine 7 is applied, a pump shell 14 integrated with the front cover 13, and a cylindrical shaft 15 integrated with the pump shell 14.

Specifically, the front cover 13 is a bottomed-cylindrical member, and a plurality of set blocks 16 to which the torque of the engine 7 is applied are attached to a face of the front cover 13 opposed to the engine 7 in a circular manner at regular intervals.

The pump shell 14 is a annular member depressed away from the front cover 13, and an outer circumferential end of the pump shell 14 is joined to a leading end of cylindrical portion of the front cover 13 by welding or the like. The pump impeller 8 is formed along an inner face of the pump shell 14.

An inner circumferential end of the pump shell 14 is joined to a flange portion 17 formed on one end of the cylindrical shaft 15 by welding or the like. A fixed shaft (not shown) is connected to a casing of a transmission 9, and the cylindrical shaft 15 is fitted onto the fixed shaft while being allowed to rotate relatively thereto.

The turbine runner 11 is formed symmetrically with the pump impeller 8. Specifically, the turbine runner 11 is an annular member bulged toward the front cover 13. A connection plate 18 is joined to an inner circumferential portion of the turbine runner 11, and a turbine hub 19 splined onto an input shaft 10 of the transmission 9 is attached to the connection plate 18 by a rivet 20.

An inner circumferential portion of the connection plate 18 is bent toward the front cover 13, and fixed to the turbine hub 19 as an output member by a rivet at a point closer to the front cover 13 than the outermost portion of the turbine hub 19.

The pump impeller 8 is rotated by the torque delivered from the engine 7 to create a spiral flow of fluid between the pump impeller 8 and the turbine runner 11. Consequently, the turbine runner 11 is rotated by the spiral flow to deliver the torque to the turbine hub 19. In order to adjust a flowing direction of the fluid toward the turbine runner 11, a stator 12 is interposed between the pump impeller 8 and the turbine runner 11 while being connected to a fixed shaft (not shown) through a one-way clutch. Specifically, the one-way clutch is engaged to stop the rotation of the stator 12 when a rotational speed of the pump impeller 8 is higher than that of the turbine runner 11. By contrast, the one-way clutch is disengaged to allow the stator 12 to rotate when the rotational speed of the pump impeller 8 is lower than that of the turbine runner 11.

When the rotational speed of the pump impeller 8 is substantially synchronized with that of the turbine runner 11, an output torque of the engine 7 may be transmitted more efficiently to the turbine hub 19 by delivering the output torque of the engine 7 to the turbine hub 19 without passing through the torque converter 2. To this end, the torque converter clutch 3 is adapted to transmit torque from the front cover 13 to the turbine hub 19 by engaging an input rotary member with an output rotary member. Specifically, the torque converter clutch 3 is adapted to enable torque transmission from the front cover 13 by bringing a friction member 22 attached to a driven plate 21 into contact with the front cover 13. Accordingly, the front cover 13 serves as the input rotary member, and the driven plate 21 serves as the output rotary member.

An inner circumferential portion of the driven plate 21 is fitted onto a first cylindrical portion 23 protruding from the turbine hub 19 toward the front cover 13, and the driven plate 21 is reciprocated on the first cylindrical portion 23 by changing a hydraulic pressure in a clearance between the driven plate 21 and the front cover 13.

A second cylindrical portion 24 is formed on an outer circumferential end of the driven plate 21 to protrude toward the pump shell 14, and an outer circumference of an annular first disc 25 is splined to an inner circumferential face of the second cylindrical portion 24.

A plurality of kidney-shaped first apertures 26 are formed on the first disc 25 in a circular manner at predetermined intervals. Each of the first aperture 26 has a predetermined length in the circumferential direction, and a coil spring 27 is held individually in the first aperture 26 to be compressed in the circumferential direction. A first internal gear 50 as the second gear of the torque converter 1 is formed on an inner circumferential face of the first disc 25.

An annular first output plate 28 is disposed adjacent to a face of the first disc 25 in the turbine runner 11 side in such a manner that the torque of the first disc 25 is transmitted to the first output plate 28 by a spring force of the coil spring 27. To this end, same number of kidney-shaped second apertures 29 as the first apertures 26 are formed on the first output plate 28 at positions to be congruent with the first apertures 26, and each of the second apertures 29 individually has a same circumferential length as the first aperture 26. An inner circumferential portion of the first output plate 28 is inserted between the connection plate 18 and the turbine hub 19, and fixed to those members by the rivet 20. The coil spring 27 is individually held in spring holders formed by overlapping the first apertures 26 with the second apertures 29, and a diameter of the coil spring 27 is greater than a total thickness of the first disc 25 and the first output plate 28. Accordingly, in the torsional vibration damper 1 according to the first embodiment, the first disc 25 serves as the input member, the first output plate 28 serves as the holding member, and the coil spring 27 serves as the elastic member.

An angular velocity (or angular acceleration) of the first disc 25 is increased by a pulsation of an input torque $T_{in}$ to the first disc 25 resulting from combustion in the engine 7, and consequently the coil springs 27 are compressed in the spring holders in one direction. In this situation, the spring forces of the coil springs 27 are applied to the first output plate 28 to increase an angular velocity (or angular acceleration) of the first output plate 28. That is, the angular velocity of the first output plate 28 is increased after the coil springs 27 are thus compressed. By contrast, when the angular velocity of the first disc 25 is decreased by a pulsation of the input torque $T_{in}$, the coil springs 27 are compressed in the other direction. In this case, the spring forces of the coil springs 27 are applied to the first output plate 28 to decrease the angular velocity of the first output plate 28. That is, the angular velocity of the first output plate 28 is decreased after the coil springs 27 are thus compressed. Thus, a phase of pulsation of the input torque $T_{in}$ to the first disc 25 and a phase of pulsation of the torque applied to the first output plate 28 are different from each other.

By thus transmitting the torque from the first disc 25 to the first output plate 28 through the coil springs 27, amplitude of the torque $T_d$ (to be called the "damper torque" hereinafter) transmitted from the first disc 25 to the first output plate 28 is reduced. Thus, the spring damper 6 is formed by the first disc 25, the first output plate 28 and the coil springs 27.

According to the first embodiment, a plurality of third apertures 30 are also formed on the first output plate 28 in an inner circumferential side of the second aperture 29, and a shaft 31 is inserted into each of the third aperture 30 in a rotatable manner. Here, it is to be noted that the number of the third apertures 30 is not necessarily identical to those of the first apertures 26 and the second apertures 29.

A first pinion gear 32 is formed on one end of the shaft 31 to be meshed with the first internal gear 50 of the first disc 25, and a second pinion gear 33 is formed on the other end of the shaft 31. Diameters and teeth numbers of the first pinion gear 32 and the second pinion gear 33 may be identical to each other, but also differentiated from each other. In the torsional vibration damper 1 according to the first embodiment, a unit formed of the first pinion gear 32, the second pinion gear 33 and the shaft 31 serves as the first gear, the first pinion gear 32 serves as the first engagement member, and the second pinion gear 33 serves as the second engagement member.

The second pinion gear 33 is meshed with internal teeth of a first ring gear 34 and external teeth of a first sun gear 35. An annular first inertial mass $I_1$ is connected to the first ring gear 34 to rotated integrally therewith, and an annular second inertial mass $I_2$ is connected to the first sun gear 35 to be rotated integrally therewith. In order to increase a volume as much as possible, the first inertial mass $I_1$ is formed in such a manner as to fill the space enclosed by a radially outer portion of the turbine runner 11, the housing 4 and the first output plate 28. Likewise, the second inertial mass $I_2$ is formed in such a manner as to fill the space enclosed by a radially inner portion of the turbine runner 11, the connection plate 18 and the first output plate 28. Here, any one of the first ring gear 34 (or the first inertial mass $I_1$) and the first sun gear 35 (or the second inertial mass $I_2$) may be omitted according to need. In the torsional vibration damper 1 according to the first embodiment, the first ring gear 34 and the first sun gear 35 serve as the third gear.

Figure 3:
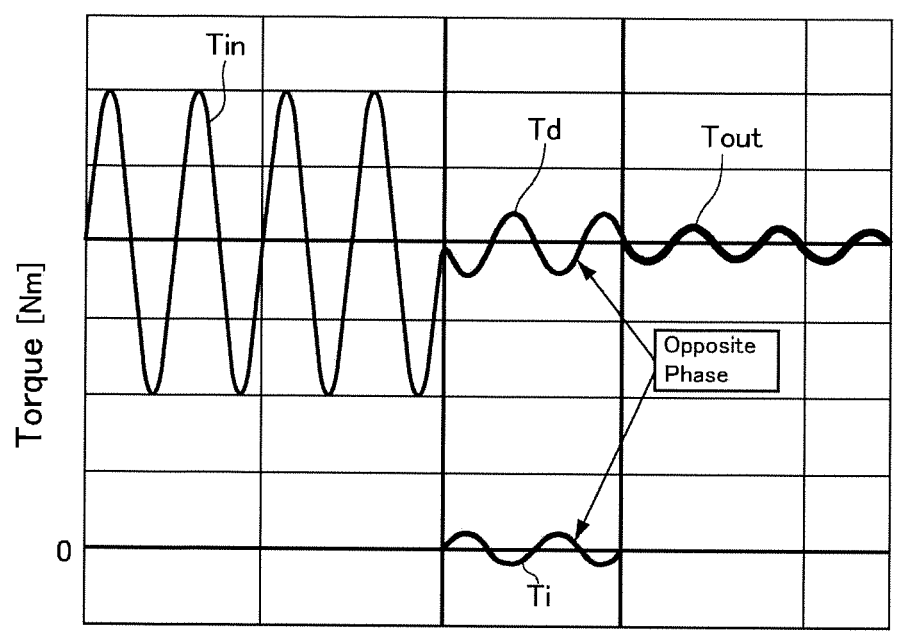
FIG. 3 is a graph indicating fluctuations in torques of rotary elements according to the first embodiment.

A phase of the pulsed input torque $T_{in}$ is indicated in FIG. 3. A frequency of the pulse of the input torque $T_{in}$ is governed by a quantity of cylinders of the engine 7 and a rotational speed of the engine 7. As described, the pulsed input torque $T_{in}$ is transmitted to the first output plate 28 through the coil springs 27. Consequently, amplitude of pulsation of the damper torque $T_d$ is reduced to be narrower than that of the input torque $T_{in}$, and a phase of the damper torque $T_d$ is shifted from that of the input torque $T_{in}$. Thus, the pulsation of the torque is damped by the spring damper 6.

That is, in the torsional vibration damper 1 according to the first embodiment, a first planetary gear unit 36 is formed of the first disc 25, the first output plate 28, and the first ring gear 34, and a second planetary gear unit 37 is formed of the first disc 25, the first output plate 28, and the first sun gear 35.

In the torsional vibration damper 1, a relative rotation between the first disc 25 and the output plate 28 is caused by the pulsation of the input torque $T_{in}$. Consequently, the first ring gear 34 and the first sun gear 35 are rotated to such an extent that the first disc 25 and the output plate 28 are allowed to rotate relatively to each other. In this situation, a rotational speed one of the first disc 25 and the output plate 28 is temporarily increased to be higher than that of the other one, and then the rotational speed one of the first disc 25 and the output plate 28 is temporarily reduced to be lower than that of the other one. Such speed change of one of the first disc 25 and the output plate 28 is repeated by the pulsation of the input torque $T_{in}$. As a result, the first ring gear 34 and the first sun gear 35 are oscillated by such reciprocating motions of the first disc 25 and the output plate 28 within predetermined regions. In this situation, frequencies of oscillations of the first ring gear 34 and the first sun gear 35 are synchronized with the frequency of pulsation of the damper torque $T_d$.

When the first ring gear 34 and the first sun gear 35 are thus oscillated, an inertia moment generated in accordance with masses of the first inertial mass $I_1$ and the second inertial mass $I_2$, and an inertia torque is generated in accordance with angular velocities of the first inertial mass $I_1$ and the second inertial mass $I_2$. The inertia torque $T_i$ thus generated by the oscillations of the first ring gear 34 and the first sun gear 35 is applied to the output plate 28, and a phase of the inertia torque $T_i$ is shown in FIG. 3. As can be seen from FIG. 3, the phase of the inertia torque $T_i$ is opposite to that of the damper torque $I_d$.

Thus, the damper torque $T_d$ and the inertia torque $T_i$ are applied to the first output plate 28, and, the phase of the inertia torque $T_i$ is opposite to that of the damper torque $T_d$. That is, the pulsation of the damper torque $T_d$ is damped by the inertia torque $T_i$. Consequently, amplitude of an output torque $T_{out}$ delivered from the first output plate 28 to the output rotary member such as the transmission 9 can be reduced as indicated by FIG. 3.

As described, in the torsional vibration damper 1, the first pinion gear 32 and the second pinion gear 33 are formed integrally with the shaft 31 to form the first gear. The first internal gear 50 of the first disc 25 is meshed with the first pinion gear 32, and the second pinion gear 33 is meshed with the first ring gear 34 connected to the first inertial mass L and the first sun gear 35 connected to the second inertial mass $I_2$. That is, the first disc 25, the first output plate 28, and the first inertial mass L and the first sun gear 35 are arranged in tandem in the axial direction of the torsional vibration damper 1. According to the first embodiment, therefore, the first inertial mass $I_1$ and the second inertial mass $I_2$ may be arranged between the first output plate 28 and the turbine runner 11 without being restricted by the first disc 25 and the first output plate 28. In other words, a design freedom of the first inertial mass $I_1$ and the second inertial mass $I_2$ is increased so that the first inertial mass $I_1$ and the second inertial mass $I_2$ may be enlarged to increase the inertia torque $T_i$ counteracting to the pulsation of the damper torque $T_d$. For this reason, pulsation of the output torque of the first output plate 28 can be suppressed effectively.

Figure 4:
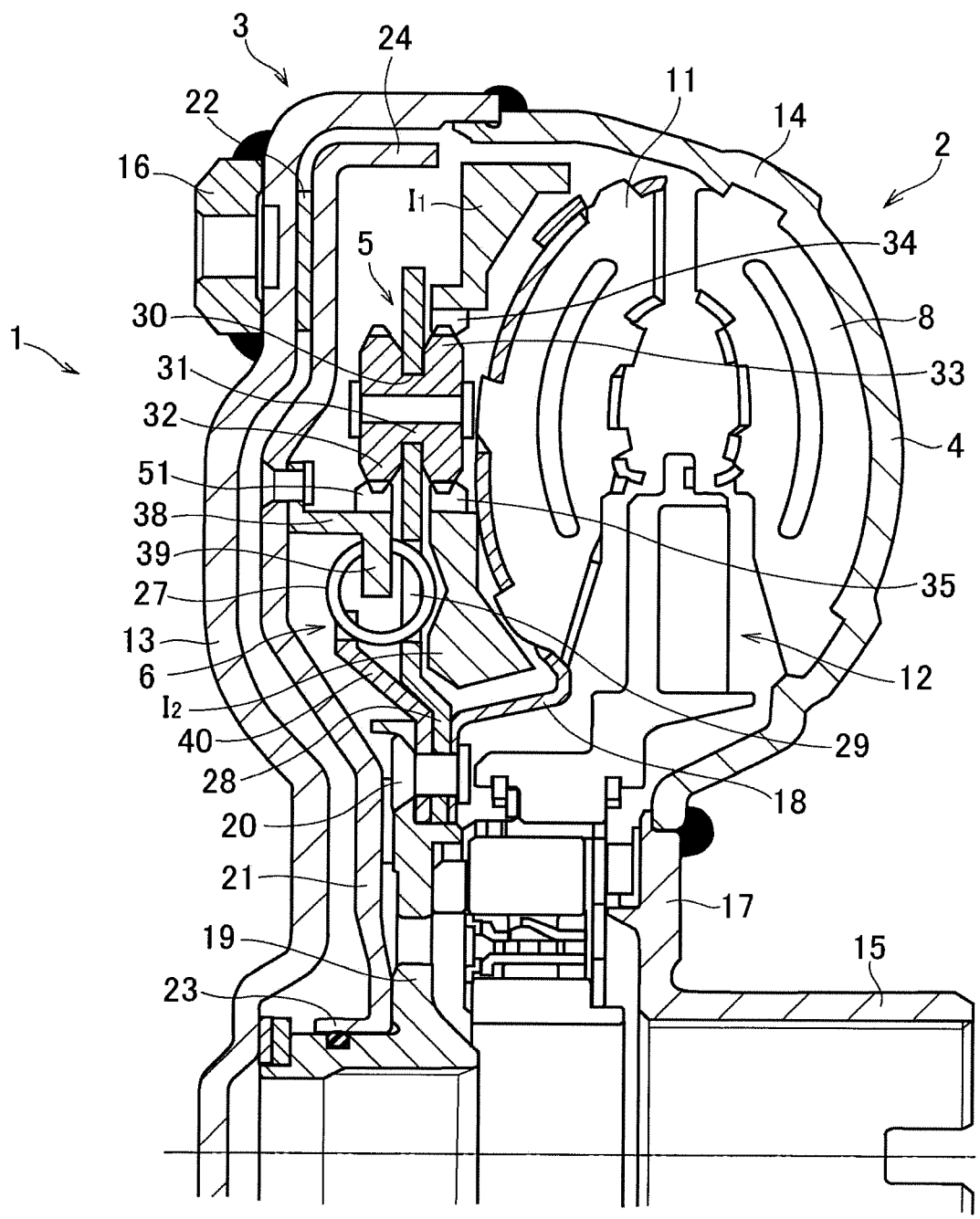
FIG. 4 is a cross-sectional view of the torsional vibration damper according to a second embodiment.
Figure 5:
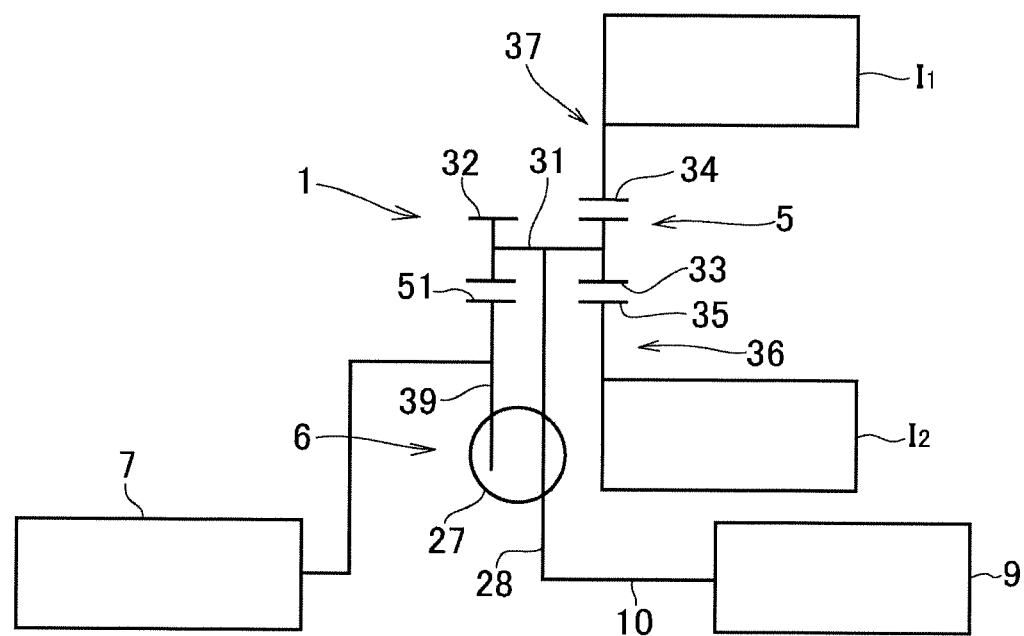
FIG. 5 is a schematic illustration showing the torsional vibration damper according to the second embodiment.

Turning to FIG. 4, there is shown a cross-section of a torsional vibration damper 1 according to the second embodiment, and FIG. 5 is a schematic diagram of the torsional vibration damper 1 according to the second embodiment. In the following explanation, common reference numerals are allotted to the common elements, and detailed explanations for the common elements will be omitted.

According to the second embodiment, a third cylindrical portion 38 is formed on the driven plate 21 protruding toward the first output plate 28 in an inner circumferential side of the shaft 31, and an annular second disc 39 is formed on a leading end of the third cylindrical portion 38. A plurality of first cutouts (not shown) individually having a predetermined length in the circumferential direction are formed on an inner circumferential end of the second disc 39 in a circular manner at predetermined intervals, and the second apertures 29 of the first output plate 28 are situated at positions to be congruent with the first cutouts.

According to the second embodiment, an annular second output plate 40 is arranged adjacent to the first output plate 28 while keeping a predetermined clearance therebetween, and the second disc 39 is situated between the first output plate 28 and the second output plate 40. A plurality of second cutouts (not shown) individually having a same length as that of the first cutout are also formed on an outer circumferential end of the second output plate 40 at positions to be congruent with the first cutouts. The coil spring 27 is individually held in each spring holder formed by the first cutout, the second cutout and the second apertures 29. Inner circumferential portions of the second output plate 40, the first output plate 28 and the connection plate 18 are fixed to the turbine hub 19 by the rivet 20. According to the second embodiment, the second disc 39 serves as the input member of the torsional vibration damper 1.

A first external gear 51 is formed on an outer circumferential face of the third cylindrical portion 38 to be meshed with the first pinion gear 32. Accordingly, the first external gear 51 serve as the second gear of the torsional vibration damper 1 according to the second embodiment.

Thus, according to the second embodiment, the first planetary gear unit 36 is formed of the second disc 39, the first output plate 28, and the first sun gear 35, and a second planetary gear unit 37 is formed of the second disc 39, the first output plate 28, and the first ring gear 34. As the first embodiment, the second disc 39 and the first output plate 28 are allowed to rotate relatively to each other. According to the second embodiment, therefore, the damper torque $T_d$ is transmitted to the first output plate 28 through the coil springs 27 by the pulsation of the input torque $T_i$, and the inertial torque $T_i$ resulting from change in an angular velocities of the first ring gear 34 and the first sun gear 35 counteracts to the damper torque $T_d$. For this reason, the advantages of the torsional vibration damper 1 according to the first embodiment may also be achieved by the torsional vibration damper 1 according to the second embodiment.

Figure 6:
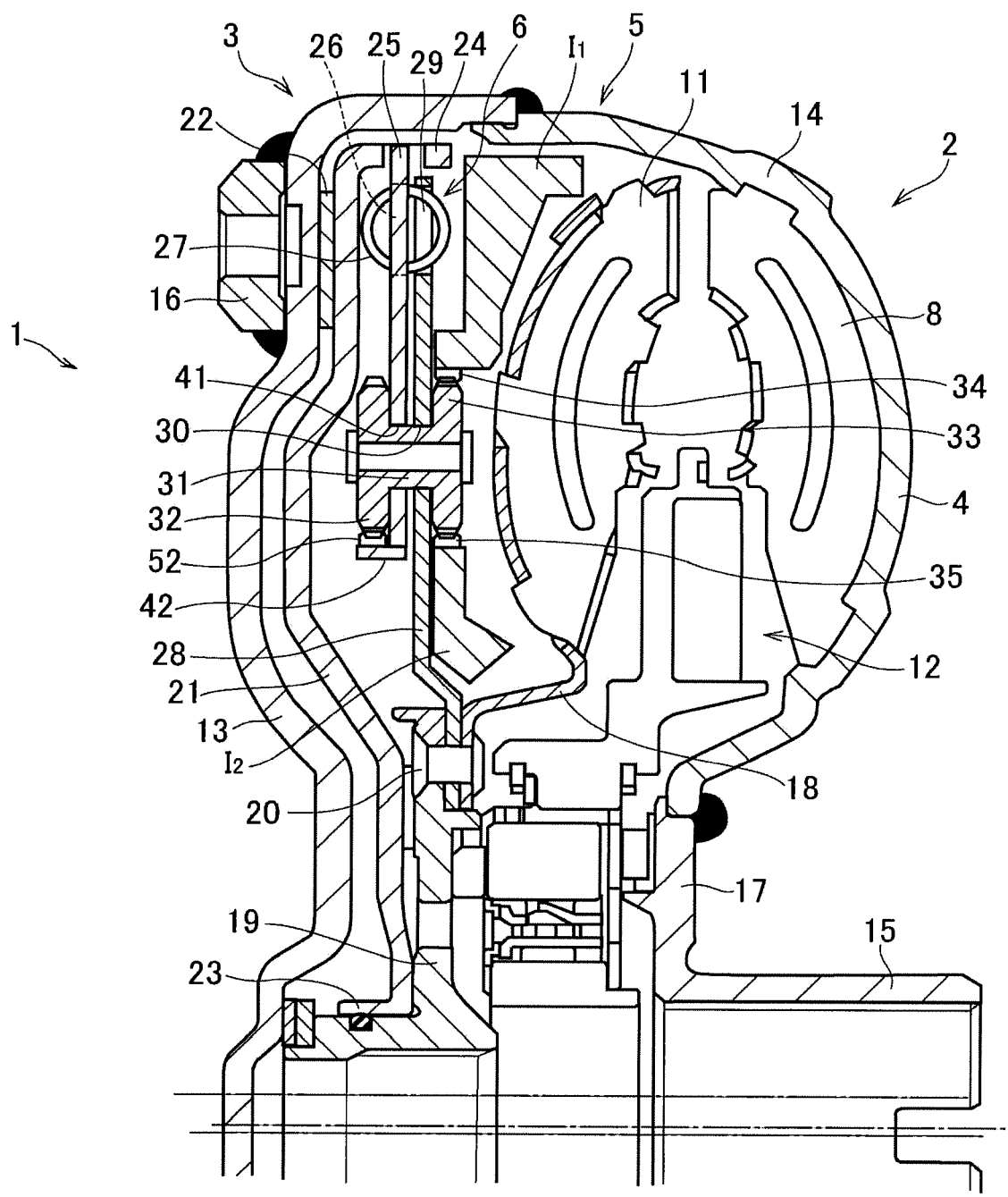
FIG. 6 is a cross-sectional view of the torsional vibration damper according to a third embodiment.
Figure 7:
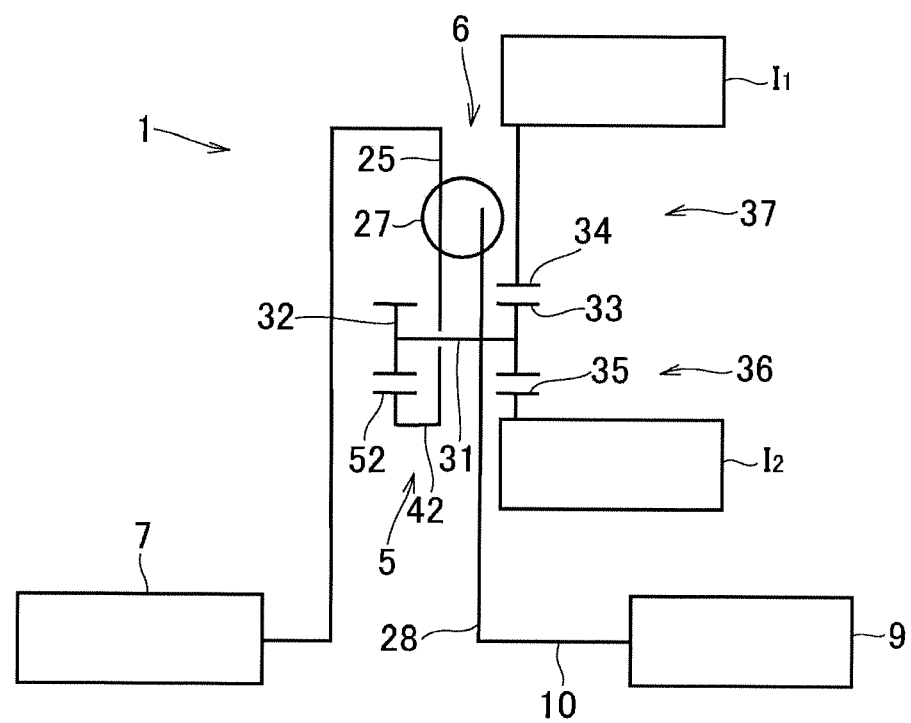
FIG. 7 is a schematic illustration showing the torsional vibration damper according to the third embodiment.

Turning to FIG. 6, there is shown a cross-section of a torsional vibration damper 1 according to the third embodiment, and FIG. 7 is a schematic diagram of the torsional vibration damper 1 according to the third embodiment. In the following explanation, common reference numerals are allotted to the common elements, and detailed explanations for the common elements will be omitted.

According to the third embodiment, a plurality of fourth apertures 41 individually having a predetermined length in the circumferential direction are formed on the first disc 25 in a circular manner at predetermined intervals, at positions to be congruent with the third apertures 30. The shaft 31 is inserted into each spring holder formed of the third aperture 30 and the fourth apertures 41 in a rotatable manner. The first pinion gear 32 is formed on one end of the shaft 31 and the second pinion gear 33 is formed on the other end of the shaft 31. That is, the first disc 25 and the first output plate 28 are interposed between the first pinion gear 32 and the second pinion gear 33. A fourth cylindrical portion 42 is formed from the inner circumferential end of the first disc 25 to protrude toward the driven plate 21, and a fourth external gear 52 is formed on an outer circumferential face of the fourth cylindrical portion 42 to be meshed with the first pinion gear 32. Accordingly, the fourth external gear 52 serves as the second gear of the torsional vibration damper 1 according to the third embodiment.

According to the third embodiment, a relative rotation between the first disc 25 and the first output plate 28 is caused by the pulsation of the input torque $T_i$, and consequently the shaft 31 is displaced in the circumferential direction within the fourth aperture 41. For this reason, the advantages of the torsional vibration damper 1 according to the first embodiment may also be achieved by the torsional vibration damper 1 according to the third embodiment.

Figure 8:
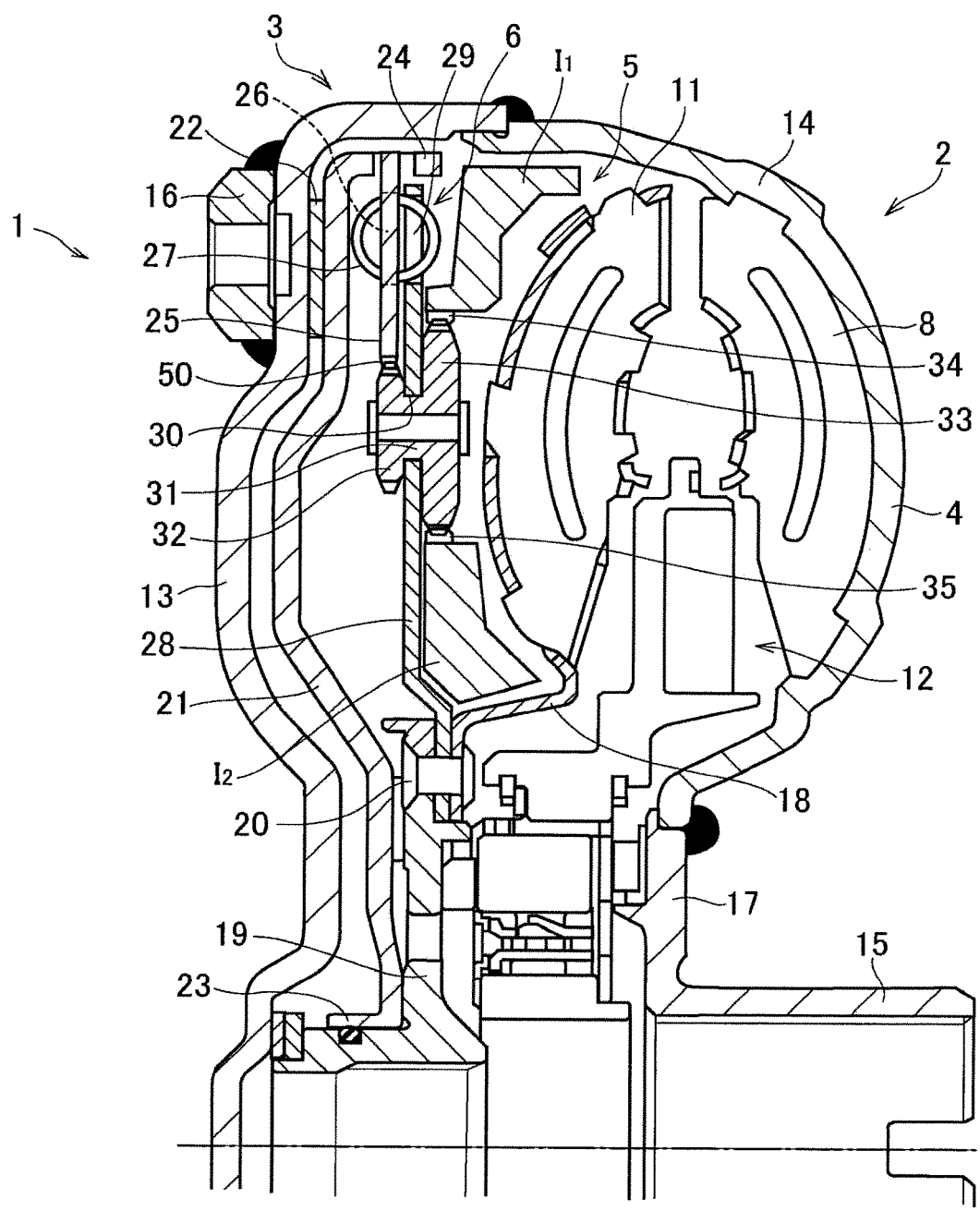
FIG. 8 is across-sectional view of the torsional vibration damper according to a fourth embodiment.
Figure 9:
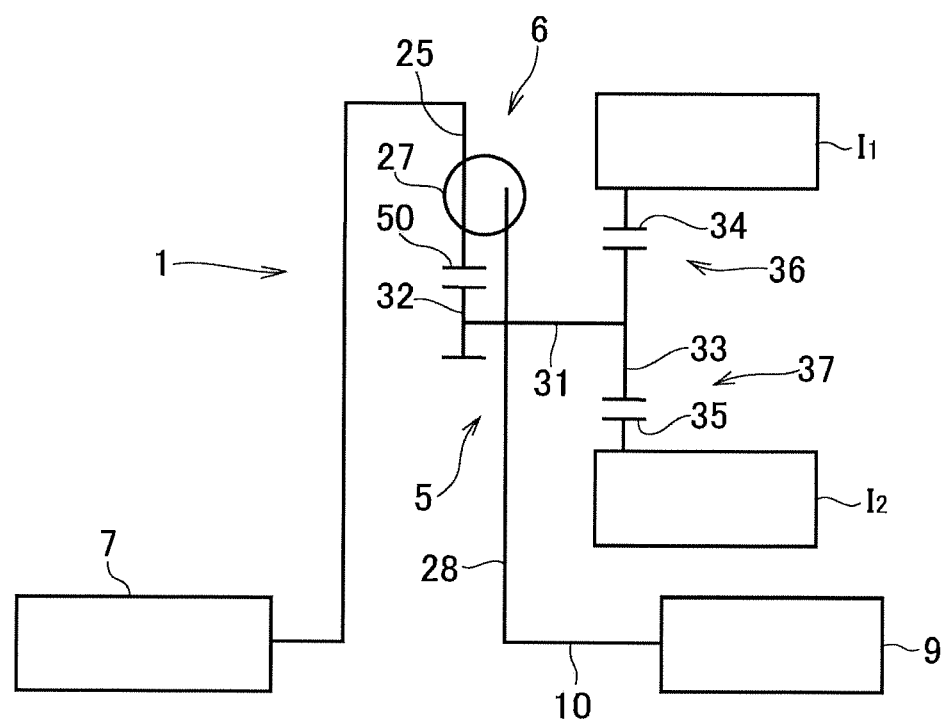
FIG. 9 is a schematic illustration showing the torsional vibration damper according to the fourth embodiment.

Turning to FIG. 8, there is shown a cross-section of a torsional vibration damper 1 according to the fourth embodiment, and FIG. 9 is a schematic diagram of the torsional vibration damper 1 according to the fourth embodiment. In the following explanation, common reference numerals are allotted to the common elements, and detailed explanations for the common elements will be omitted. According to the fourth embodiment, a pitch circle diameter of the first pinion gear 32 is differentiated from that of the second pinion gear 33. Specifically, the pitch circle diameter of the second pinion gear 33 is larger than that of the pinion gear 32.

By thus differentiating the pitch circle diameters of the first pinion gear 32 and the second pinion gear 33, changes in the angular velocities of the first ring gear 34 and the first sun gear 35 resulting from pulsation of the input torque $T_{in}$ may be adjusted. That is, the inertia torque $T_i$ counteracting to the damper torque $T_d$ may be adjusted to adjust the vibration damping performance of the torsional vibration damper 1. Specifically, changes in the angular velocities of the first ring gear 34 and the first sun gear 35 resulting from pulsation of the damper torque $T_d$ may be increased by increasing the pitch circle diameter of the second pinion gear 33 to be larger than that of the first pinion gear 32. Consequently, the inertia torque $T_i$ counteracting to the damper torque $T_d$ can be increased to enhance vibration damping performance of the torsional vibration damper 1.

Figure 10:
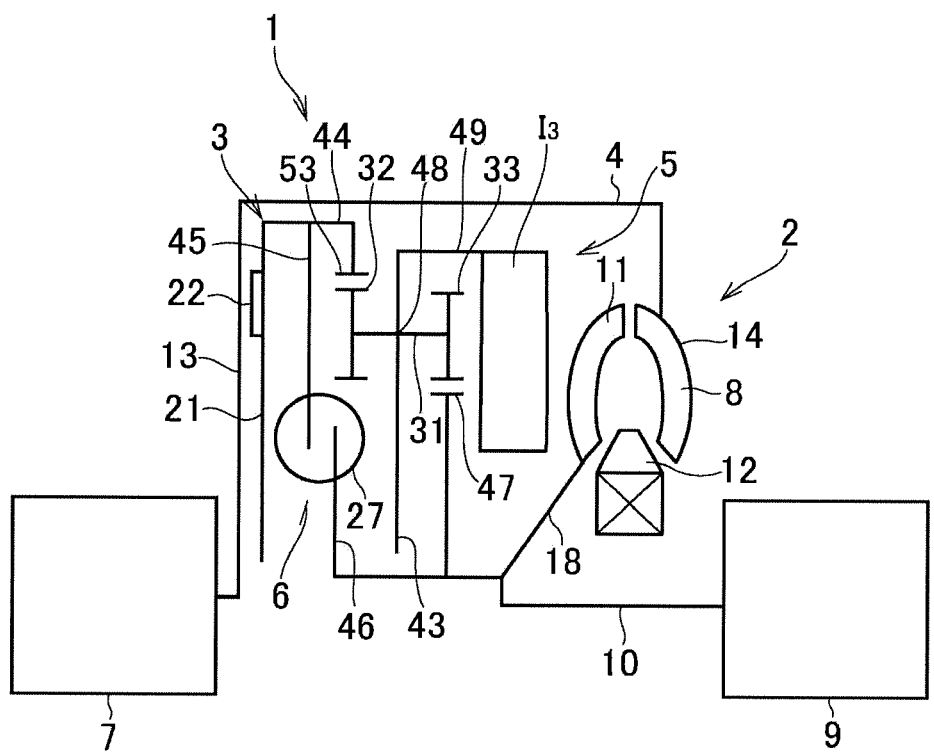
FIG. 10 is a schematic illustration showing the torsional vibration damper according to the fifth embodiment in which the inertial mass is connected to the carrier plate.

In the torsional vibration damper 1 according to the present application, the inertial mass may also be connected to the element other than the second pinion gear 33. Turning to FIG. 10, there is schematically shown the torsional vibration damper 1 according to the fifth embodiment in which a third inertial mass 13 is connected to an annular carrier plate 43. The annular carrier plate 43 serves as the holding member. In the following explanation, common reference numerals are allotted to the elements in common with the foregoing embodiments, and detailed explanations for the common elements will be omitted.

According to the fifth embodiment, a fifth cylindrical portion 44 protrudes from an outer circumferential end of the driven plate 21 toward the turbine runner 11, and an annular third disc 45 is connected to an intermediate portion of the fifth cylindrical portion 44. The third disc 45 is also connected a third output plate 46 through the coil springs 27. A plurality of cutouts (not shown) individually having a predetermined length in the circumferential direction are formed on an inner circumferential end of the third disc 45 in a circular manner at predetermined intervals, and a plurality of another cutouts (not shown) individually having a same length as the cutout of the third disc are also formed on an outer circumferential end of the third output plate 46 at positions to be congruent with the cutouts of the third disc. The coil springs 27 are held in spring holders formed by the cutouts of the third disc 45 and the cutouts of the third output plate 46.

A second internal gear 53 is connected to a leading end of the fifth cylindrical portion 44 to be rotated integrally therewith. A second sun gear 47 is connected to the turbine hub 19 to be rotated integrally therewith, at a portion between the third output plate 46 and the connection plate 18, more specifically, between the leading end of the fifth cylindrical portion 44 and the turbine runner 11. The carrier plate 43 is disposed between the leading end of the fifth cylindrical portion 44 and the second sun gear 47 while being supported by a not shown bearing in such a manner as to rotate relatively to the turbine hub 19.

A plurality of fifth apertures 48 are formed on the carrier plate 43 in a circular manner at predetermined intervals, and the shaft 31 is inserted into each of the fifth aperture 30 in a rotatable manner. As the foregoing embodiments, the first pinion gear 32 is formed on one end of the shaft 31 to be meshed with internal teeth of the fifth cylindrical portion 44, and the second pinion gear 33 is formed on the other end of the shaft 31 to be meshed with the second sun gear 47. An outer circumferential end of the carrier plate 43 is situated in a radially outer side of the second pinion gear 33. A sixth cylindrical portion 49 is formed from the outer circumferential end of the carrier plate 43 to protrude toward the turbine runner 11, and the third inertial mass $I_3$ is connected to the sixth cylindrical portion 49. Accordingly, the second internal gear 53 serves as the second gear, and the second sun gear 47 serves as the third gear of the torsional vibration damper 1 according to the fifth embodiment.

According to the fifth embodiment, the third inertial mass $I_3$ may also be arranged between the third output plate 46 and the turbine runner 11. According to the fifth embodiment, therefore, the advantages of the torsional vibration damper 1 according to the foregoing embodiments may also be achieved.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A torsional vibration damper, comprising:
   a fluid coupling that transmits an output torque of an engine to an output member through fluid;
   a clutch that transmits the output torque of the engine to the output member without passing through the fluid coupling by engaging an input rotary member and an output rotary member;
   an input member to which the output torque of the engine is delivered through the clutch;
   an elastic member that is interposed between the input member and the output member to elastically transmit torque of the input member to the output member;
   an inertial mass that applies an inertia torque to the output member, in a phase opposite to that of pulsation of the torque delivered to the output member through the elastic member;
   a holding member that is disposed while keeping a predetermined clearance from the clutch and the fluid coupling in an axial direction;
   a first gear held in the holding member while being allowed to rotate, that includes a first engagement member situated across the holding member from the fluid coupling, and a second engagement member situated between the holding member and the fluid coupling;
   a second gear meshed with the first engagement member; and
   a third gear meshed with the second engagement member, wherein
   the second gear is rotated integrally with the input member, the third gear is rotated integrally with any one of the output member and the inertial mass, and the holding member is rotated integrally with the other of the output member and the inertial mass.

2. The torsional vibration damper as claimed in claim 1, wherein the inertial mass is connected to the third gear to be rotated integrally therewith, and
   wherein a pitch circle diameter of the second engagement member is larger than that of the first engagement member.

3. The torsional vibration damper as claimed in claim 1, wherein the inertial mass is rotated integrally with the holding member,
   wherein a cylindrical portion protrudes from an outer circumferential end of the holding member toward the fluid coupling, the cylindrical portion being disposed radially outward of the second engagement member and the third gear, and wherein the inertial mass is connected to the cylindrical portion to be rotated integrally therewith, and disposed between the fluid coupling and the second engagement member meshed with the third gear.

\* \* \* \* \*